(12) United States Patent
Hodges et al.

(10) Patent No.: US 10,326,877 B2
(45) Date of Patent: *Jun. 18, 2019

(54) DRIVING WITHOUT DISTRACTION SUPPORT SYSTEM

(71) Applicant: Location Labs, Inc., Emeryville, CA (US)

(72) Inventors: Daniel Hodges, San Francisco, CA (US); Tasos Roumeliotis, Orinda, CA (US)

(73) Assignee: Location Labs, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,288

(22) Filed: Jul. 31, 2017

(65) Prior Publication Data
US 2017/0331943 A1 Nov. 16, 2017

Related U.S. Application Data

(62) Division of application No. 14/456,580, filed on Aug. 11, 2014, now Pat. No. 9,749,458.

(51) Int. Cl.
*H04W 64/00* (2009.01)
*H04M 1/725* (2006.01)
*H04W 4/02* (2018.01)
*H04W 4/38* (2018.01)

(52) U.S. Cl.
CPC ....... *H04M 1/72577* (2013.01); *H04W 4/025* (2013.01); *H04W 4/38* (2018.02)

(58) Field of Classification Search
CPC .......... H04M 1/72577; H04W 4/027; H04W 4/003; G06F 2221/2149; G06F 21/88; G06F 21/121
USPC ....... 455/404.2, 405, 418, 419, 456.1, 456.3
See application file for complete search history.

(56) References Cited

U.S. PATENT DOCUMENTS

| 5,833,479 | A | 11/1998 | Talbot |
| 6,690,940 | B1 | 2/2004 | Brown et al. |
| 7,248,961 | B2 | 7/2007 | Park et al. |
| 7,493,655 | B2 | 2/2009 | Brown |
| 7,593,740 | B2 | 9/2009 | Crowley et al. |
| 7,606,772 | B2 | 10/2009 | Flinn et al. |
| 7,705,726 | B2 | 4/2010 | Graves et al. |
| 7,876,704 | B1 | 1/2011 | Bims et al. |

(Continued)

*Primary Examiner* — Sam Bhattacharya
(74) *Attorney, Agent, or Firm* — Dovas Law, P.C.

(57) ABSTRACT

A processor-implemented system for supporting use of a reduced driving distraction program on a mobile device is disclosed. The system detects whether the mobile device is in a moving vehicle. If so, a driving mode is set in which driving is determined to be protected driving if the reduced distraction program is being followed and unprotected if the reduced distraction program is not being followed. The system then tracks unprotected driving and protected driving and aggregates the unprotected driving and protected driving. A party is then notified regarding the aggregation of unprotected driving and protected driving. Other drivers can be asked to join the reduced driving distraction program and awards can be given to drivers for meeting pre-determined milestones of protected driving. Either the mobile device or a remote computer may aggregate driving and send notifications.

27 Claims, 5 Drawing Sheets

(56) References Cited

U.S. PATENT DOCUMENTS

| | | |
|---|---|---|
| 7,881,864 B2 | 2/2011 | Smith |
| 8,073,907 B2 | 12/2011 | Roumeliotis et al. |
| 8,095,175 B2 | 1/2012 | Todd et al. |
| 8,107,432 B2 | 1/2012 | Seo |
| 8,135,392 B2 | 3/2012 | Marcellino et al. |
| 8,145,240 B2 | 3/2012 | Roumeliotis et al. |
| 8,229,421 B2 | 7/2012 | Notes et al. |
| 8,244,236 B2 | 8/2012 | Roumeliotis et al. |
| 8,351,408 B2 | 1/2013 | Daigle |
| 8,509,814 B1 | 8/2013 | Parker |
| 8,621,075 B2 | 12/2013 | Luna |
| 8,738,688 B2 | 5/2014 | Myers et al. |
| 8,843,122 B1 | 9/2014 | Wick et al. |
| 8,856,322 B2 | 10/2014 | Dare et al. |
| 8,948,790 B1 | 2/2015 | Kim et al. |
| 9,749,458 B2 * | 8/2017 | Hodges ............. H04M 1/72577 |
| 2003/0005306 A1 | 1/2003 | Hunt et al. |
| 2003/0105854 A1 | 6/2003 | Thorsteinsson et al. |
| 2004/0122734 A1 | 6/2004 | Schleicher et al. |
| 2005/0136949 A1 | 6/2005 | Barnes |
| 2005/0195193 A1 | 9/2005 | Lehman |
| 2006/0085547 A1 | 4/2006 | Cormier |
| 2006/0099965 A1 | 5/2006 | Aaron |
| 2006/0184792 A1 | 8/2006 | Berlin |
| 2006/0200435 A1 | 9/2006 | Flinn et al. |
| 2006/0270421 A1 | 11/2006 | Phillips et al. |
| 2007/0150567 A1 | 6/2007 | Lamparello et al. |
| 2007/0208802 A1 | 9/2007 | Barman et al. |
| 2007/0214475 A1 | 9/2007 | Lee et al. |
| 2007/0218900 A1 | 9/2007 | Abhyanker |
| 2008/0146250 A1 | 6/2008 | Aaron |
| 2008/0246605 A1 | 10/2008 | Pfeffer et al. |
| 2008/0252487 A1 | 10/2008 | McClellan et al. |
| 2009/0002147 A1 | 1/2009 | Bloebaum et al. |
| 2009/0085728 A1 | 4/2009 | Catten et al. |
| 2010/0148920 A1 | 6/2010 | Philmon et al. |
| 2010/0210254 A1 | 8/2010 | Kelly et al. |
| 2010/0216509 A1 | 8/2010 | Riemer et al. |
| 2010/0241709 A1 | 9/2010 | Roumeliotis et al. |
| 2010/0306138 A1 | 12/2010 | Hotes et al. |
| 2011/0016514 A1 | 1/2011 | De Carlo et al. |
| 2011/0021234 A1 | 1/2011 | Tibbitts et al. |
| 2011/0029598 A1 | 2/2011 | Arnold et al. |
| 2011/0093161 A1 | 4/2011 | Zhou et al. |
| 2011/0105082 A1 | 5/2011 | Haley |
| 2011/0151830 A1 | 6/2011 | Blanda et al. |
| 2011/0228753 A1 | 9/2011 | Polito et al. |
| 2011/0252375 A1 | 10/2011 | Chaudri |
| 2011/0275321 A1 | 11/2011 | Zhou et al. |
| 2011/0281564 A1 | 11/2011 | Armitage et al. |
| 2011/0294520 A1 | 12/2011 | Zhou et al. |
| 2012/0001548 A1 | 1/2012 | Recker et al. |
| 2012/0036220 A1 | 2/2012 | Dare et al. |
| 2012/0036245 A1 | 2/2012 | Dare et al. |
| 2012/0077523 A1 | 3/2012 | Roumeliotis et al. |
| 2012/0081500 A1 | 4/2012 | Border et al. |
| 2012/0100866 A1 | 4/2012 | Grossman et al. |
| 2012/0135756 A1 | 5/2012 | Rosso et al. |
| 2012/0179767 A1 | 7/2012 | Clarke et al. |
| 2012/0188163 A1 | 7/2012 | Xiao |
| 2012/0223861 A1 | 9/2012 | Kupfer et al. |
| 2012/0244883 A1 | 9/2012 | Tibbitts et al. |
| 2012/0260118 A1 | 10/2012 | Jiang et al. |
| 2012/0271908 A1 | 10/2012 | Luna et al. |
| 2012/0311655 A1 | 12/2012 | Hohlfeld et al. |
| 2012/0323990 A1 | 12/2012 | Hayworth |
| 2012/0330702 A1 | 12/2012 | Kowalski et al. |
| 2013/0040629 A1 | 2/2013 | Sprigg et al. |
| 2013/0054674 A1 | 2/2013 | Myers et al. |
| 2013/0111462 A1 | 5/2013 | Umansky et al. |
| 2013/0143512 A1 | 6/2013 | Hernandez et al. |
| 2013/0145007 A1 | 6/2013 | Randazzo et al. |
| 2013/0166209 A1 | 6/2013 | Pollington et al. |
| 2013/0198272 A1 | 8/2013 | Shionoya et al. |
| 2013/0198296 A1 | 8/2013 | Roy et al. |
| 2013/0210406 A1 | 8/2013 | Vidal et al. |
| 2013/0217331 A1 | 8/2013 | Manente |
| 2013/0281079 A1 | 10/2013 | Vidal et al. |
| 2013/0283298 A1 | 10/2013 | Ali et al. |
| 2013/0303143 A1 | 11/2013 | Schrader et al. |
| 2013/0310078 A1 | 11/2013 | Raman et al. |
| 2013/0316746 A1 | 11/2013 | Miller |
| 2013/0332886 A1 | 12/2013 | Cranfill et al. |
| 2013/0339345 A1 | 12/2013 | Soto et al. |
| 2013/0346333 A1 | 12/2013 | Hassler |
| 2014/0082065 A1 | 3/2014 | Anakata |
| 2014/0087708 A1 | 3/2014 | Kalita et al. |
| 2014/0108649 A1 | 4/2014 | Barton et al. |
| 2014/0143108 A1 | 5/2014 | Smith et al. |
| 2014/0148192 A1 | 5/2014 | Hodges et al. |
| 2014/0179261 A1 | 6/2014 | Riggs et al. |
| 2014/0179348 A1 | 6/2014 | Simon |
| 2014/0187219 A1 | 7/2014 | Yang et al. |
| 2014/0236846 A1 | 8/2014 | Melika et al. |
| 2014/0310327 A1 | 10/2014 | Yip et al. |
| 2014/0310365 A1 | 10/2014 | Sample et al. |
| 2014/0316990 A1 | 10/2014 | Winston |
| 2014/0338006 A1 | 11/2014 | Grkov et al. |
| 2014/0364153 A1 | 12/2014 | Ren |
| 2014/0370857 A1 | 12/2014 | Bovis |
| 2015/0040246 A1 | 2/2015 | Yuen et al. |
| 2015/0058488 A1 | 2/2015 | Backholm |
| 2015/0095970 A1 | 4/2015 | Shetty |
| 2015/0097669 A1 | 4/2015 | Li |
| 2015/0099500 A1 | 4/2015 | Chalmers |
| 2015/0169853 A1 | 6/2015 | Singh |
| 2015/0188777 A1 | 7/2015 | Frost |
| 2015/0227752 A1 | 8/2015 | Anakata et al. |
| 2016/0006861 A1 | 1/2016 | Hodges |
| 2016/0014262 A1 | 1/2016 | Hodges et al. |
| 2016/0044156 A1 | 2/2016 | Hodges |

\* cited by examiner

DRIVING WITHOUT DISTRACTION SUPPORT SYSTEM

CROSS REFERENCE TO RELATED APPLICATION(S)

This application is a division of U.S. patent application Ser. No. 14/456,580, filed Aug. 11, 2014, which is incorporated by reference as if fully set forth.

BACKGROUND

Mobile communication devices such as smart phones and the like have become widespread and highly popular. Unfortunately, mobile devices are all-too-often used at inappropriate times such as when driving. This has created a desire by parents, guardians, employers and others to monitor the use of mobile devices used by those under their supervision and to restrict their use during driving. However, overly restricting the use of mobile devices may end up sacrificing the safety and convenience offered by such devices while leading to active circumvention of restrictions by device users.

There are numerous systems that are currently available that reduce driving distractions when using mobile communication devices when driving. Assuming that one does not need mobile communications when driving, or assuming one can get another to use their mobile communication device, the simple On-Off button works great. In practice, that is not something to be relied on. Another approach is the installation of one or more of the currently available systems to deter use of mobile devices when driving by automatically blocking access to some or all of the functionalities of mobile devices when their owners are found to be driving. Blocked functionalities can include blocking incoming calls, preventing outgoing calls, blocking text messages, shutting off ring tones and vibrations, and limiting or locking the mobile device display.

Still, systems that minimize phone distractions while driving can result in a rather solitary experience. As one becomes out of touch with friends, family, office, employers, employees, customers, and services the feeling of being left out and of not sharing experiences and ideas with others can entice a driver to circumvent the safe driving system being used. This is a problem even for those that take safe driving very seriously.

Therefore, a system that supports safe driving systems and that makes safe driving more interesting, more engaging, more useful and possibly even fun would be highly valuable.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided which includes transmitting a device control application to a plurality of mobile devices. The device control application is configured to access at least one of location data, such as GPS data, and sensor data, such as acceleration data, of a particular mobile device on which the device control application is installed and then to determine when the particular mobile device is in a moving vehicle based on the at least one of the location data and the sensor data. When in a moving vehicle the device control application disables at least one functional component of the particular mobile device and provides operation data corresponding to use of the device control application on the particular mobile device to a particular user of the particular mobile device via a user interface. Then, transmitting the operation data through a network and which is received by a network connectable computing system from the plurality of mobile devices operation data corresponding to use of the device control application on the plurality of mobile devices. The computing system performs aggregating the operation data from the plurality of mobile devices by a processor and then selectively transmitting the operation data of the plurality of mobile devices to users of the plurality of mobile devices. The device control application is further configured to provide to the user of the particular mobile device via the user interface the operation data of the plurality of mobile devices.

A mobile computing device ("particular mobile device) is provided which includes at least one non-transitory computer readable storage medium having encoded thereon instructions that, when executed by one or more processors, cause the particular mobile device to perform a process. That process includes accessing at least one of location data (such as GPS data) and sensor data (such as acceleration data) of the particular mobile device on which the device control application is installed; determining when the particular mobile device is in a moving vehicle based on at least one of the location data and the sensor data; and disabling at least one functional component of the particular mobile device based on determining that the particular mobile device is in a moving vehicle. The process further provides operation data corresponding to the use of the device control application on the particular mobile device to a user of the particular mobile device via a user interface, and transmits through a network the operation data corresponding to use of the device control application on the particular mobile device. Operation data corresponding to the use of the device control application on a plurality of other mobile devices is received from a network connected computing system, and the operation data is provided to the user of the particular mobile device via the user interface.

A method is provided which includes using a processor to run a reduced distraction program on a mobile device and detecting whether the mobile device is in a moving vehicle. If the mobile device is in a moving vehicle, then a driving mode is set in which driving is determined to be protected driving if the reduced distraction program is being followed and unprotected driving if the reduced distraction program is not being followed. Then, unprotected driving is tracked, protected driving is tracked and unprotected driving and protected driving are aggregated. Then, a party is notified regarding the aggregation of unprotected driving and protected driving.

Aggregating can be performed using either or both a processor of the mobile device or a processor of a remote computer. Detecting whether the mobile device is in a moving vehicle can be performed automatically or partially based on user input. The party that is notified can be the driver, another driver, or a third party such as a parent or employer. The notification can include miles driven and/or times driven. An award can be granted to a driver for reaching a pre-determined protected driving milestone. A third party can also be notified that a reduced distraction program is being followed, and that third party can be asked to join in following a reduced distraction program.

A mobile device is provided which includes a non-transitory computer readable storage medium having encoded thereon instructions that, when executed by a processor causes the mobile device to perform processes including implementing a driving with reduced distraction system; detecting whether the mobile device is in a moving vehicle; and setting a driving mode when the mobile device is detected in a moving vehicle. The driving mode determines that driving is protected driving if the reduced distraction system is being followed and that driving is unprotected driving if the reduced distraction system is not being followed. The mobile device then tracks unprotected driving and protected driving. The user is informed about the status of the mobile device.

The mobile device can aggregate unprotected driving and protected driving or it can send unprotected driving and protected driving information to a remote computer. Detecting whether the mobile device is in a moving vehicle can be performed automatically or it can be at least partially based on driver input. The mobile device can send a notification regarding the aggregation of unprotected driving and protected driving. Aggregation can include miles driven and/or information regarding the times of driving. A party can be informed about the aggregation. Additionally, at least parts of the aggregation, such as protected miles, can be displayed on the mobile device.

A computer system is provided which includes a non-transitory computer readable storage medium having encoded thereon instructions that, when executed by a processor causes the computer system to perform processes including receiving from a mobile device protected driving information representing driving in accord with a reduced distraction system and receiving from the mobile device unprotected driving information representing driving not in accord with the reduced distraction system. The computer system tracks unprotected driving and protected driving and aggregates the tracked unprotected driving and the tracked protected driving. The mobile device sends a notification regarding the aggregation of at least the protected driving.

The notification can include miles driven or times driven. The computer system can further determine if an award should be granted to the driver for reaching a pre-determined protected driving milestone. That award can be published. The computer system can also notify a party regarding the aggregation of unprotected driving and protected driving.

BRIEF DESCRIPTION OF THE DRAWING(S)

A more detailed understanding may be had from the following detailed description when taken in conjunction with the accompanying drawings. However, the figures in the drawings and the detailed description are examples only and are not to be considered limiting as other implementations are possible. In the figures like reference numerals indicate like elements, and wherein:

FIG. 1 presents a diagram of a network system suitable for practicing a driving without distraction system.

DETAILED DESCRIPTION OF ILLUSTRATIVE EMBODIMENT(S)

The described illustrative embodiments are not limiting. A person skilled in the art will appreciate that many other embodiments are possible without deviating from the described basic concepts. The terms "a" and "an" as used herein do not denote a limitation of quantity but rather denote the presence of at least one of the referenced items.

The driving without distraction ("DWD") system 20 is a multi-party safety support system that runs as an application on mobile devices and as software on a server or other computer system. The overall goal is improving driving safety by supporting driver compliance with a distraction reduction system. The DWD system 20 is implemented on processor-controlled devices running in accord with computer programs. Those programs can be implemented in software or in firmware, and if in software the programs are beneficially stored on one or more non-transitory computer-readable storage devices. As explained in more detail subsequently, the DWD system 20 may be an independent app running on a mobile device 31 (see FIG. 1) or it can be incorporated as part of a larger driving distraction reduction system.

Figure 1:
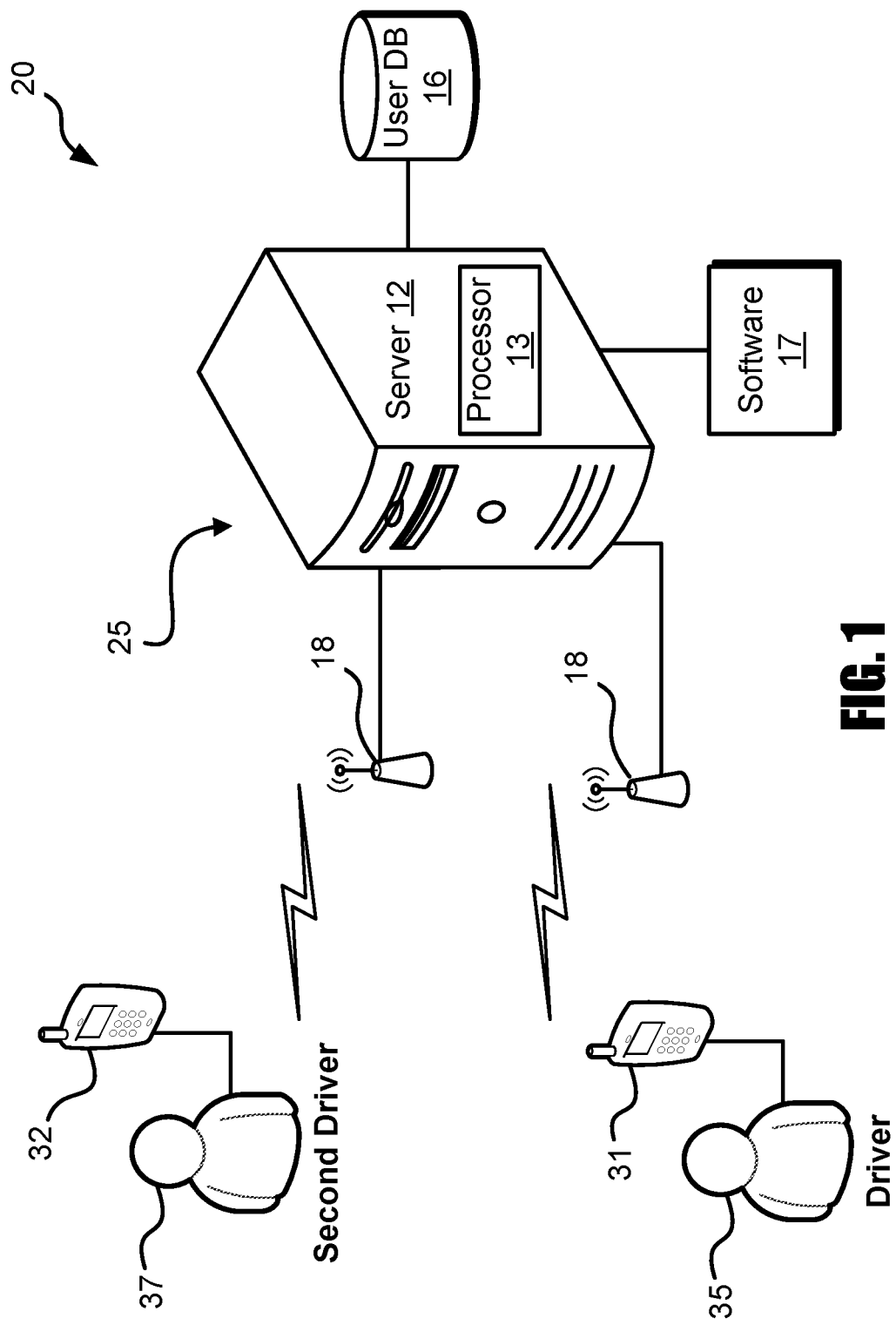

FIG. 1 illustrates a prototypical infrastructure suitable for implementing the DWD system 20. A network carrier 25 operates a processor 13 controlled server 12 including a user database 16 and a network communication system 18. That communication system 18 should be understood as including a structure of cellular towers, internet links, phone lines, microwave towers, and other communication facilities. The server 12 runs in accord with internal operating software 16 which supports the network carrier 25 to perform its tasks of telephone communications, text messaging, data transferring, and implementing its part of the DWD system 20.

Still referring to FIG. 1, the network carrier 25 is in communication with a mobile device 31 of a driver 35 and in further communication with a mobile device 32 of another driver referred to herein for convenience as a second user 37. In practice there may be many second users 37. The mobile devices 31 and 32 are processor-based mobile devices that use the network carrier's communication system 18. The second user 37 may be but is not necessarily in communication at any time with the driver 35.

In practice, the driver 35 may be a child or an employee of a third party that directly or indirectly seeks to control the mobile device 31 to implement a reduced driving distraction program. The DWD system 20 is designed to motivate the driver 35 to follow that reduced driving distraction program. In essence, the DWD system 20 improves driving safety by motivating drivers to follow a driving safety plan.

Still referring to FIG. 1, the network carrier 25 provides data, voice, picture, and other services to the driver 35 and possibly to the second user 37. It should be understood that some party, for example, the driver's parent, employer, or the driver 35 himself/herself will implement some type of reduced driving distraction setup in which the mobile device 31 is controlled to have either totally or at least reduced functionality when the driver 35 is driving. In practice, the DWD system 20 or portion thereof will be transmitted (such as from the server 12) as a device control application to a plurality of mobile devices such as the mobile devices 31 and 32. For example, the mobile device 31 can either be switched to, or it can automatically switch to, a driving state without ring tones, vibrations, lights, display, as well as having reduced capabilities such as some or all incoming or outgoing calls being blocked.

Figure 2:
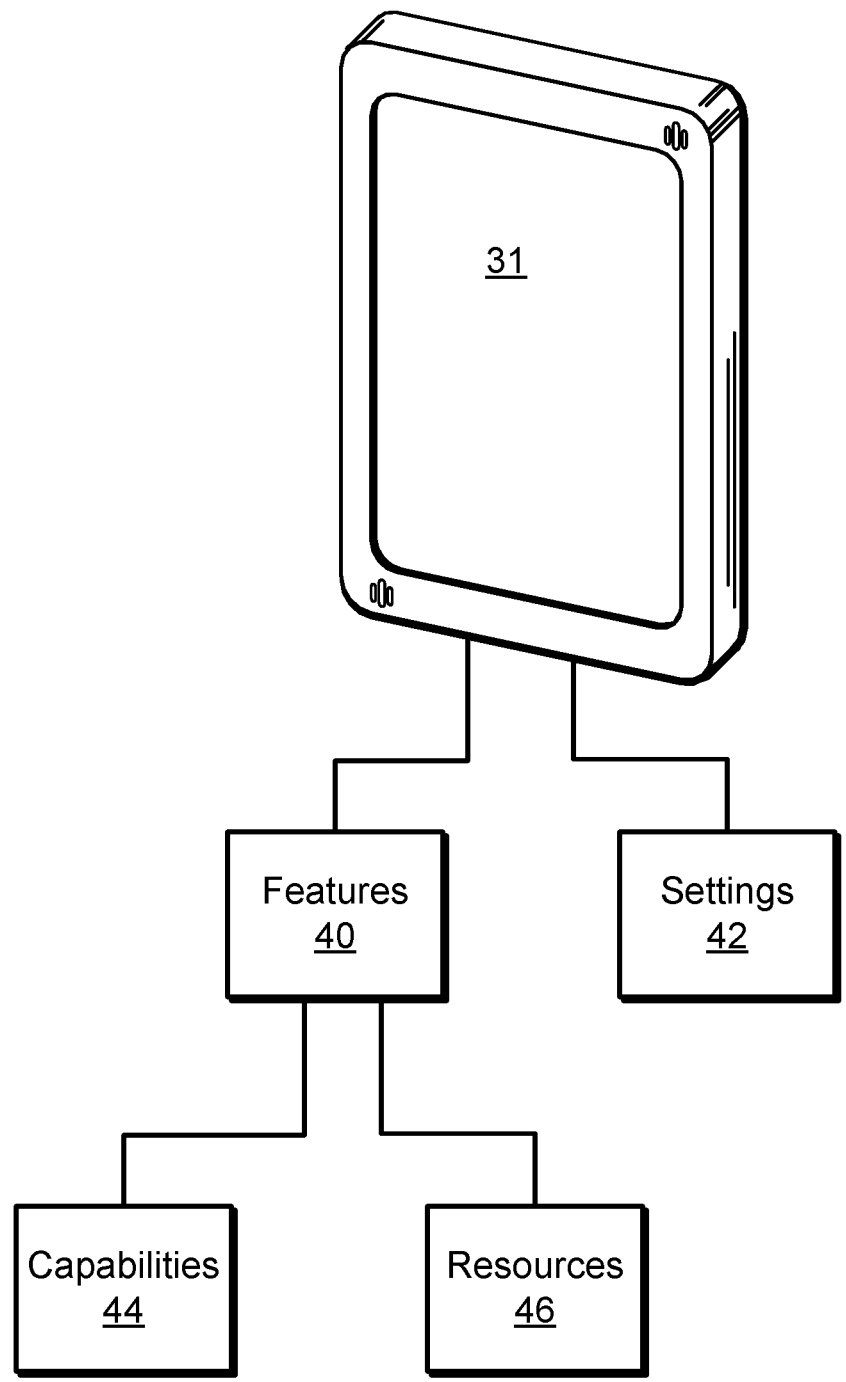
FIG. 2 is a depiction of the controls and settings of a mobile device 31 shown in FIG. 1.

FIG. 2 illustrates the functional components of the mobile device 31. As described in more detail elsewhere the DWD system 20 is implemented as a top-level application that tracks the usage of a reduced driving distraction setup. As shown, the mobile device 31 has a number of features 40 and setting 42. Those features would typically be provided by the mobile device's OEM (original equipment manufacturer), the operator of the network carrier 25 (such as by firmware control), or added to the mobile device as an app (application). The settings 42 control the features 40, for example, a volume control setting. The features 40 and the resources 46 of the mobile device 31 provide the mobile device 31 with capabilities 44 such telephone communications, email capabilities, and alarms.

Reduced driving distraction programs and the automatic detection of driving are taught in numerous references, for example, in U.S. patent application Ser. No. 13/087,302, entitled, "System and Method for Preventing Mobile Device Communication," filed on Apr. 14, 2011; U.S. patent application Ser. No. 13/217,093, entitled "System and Method for Enabling Control of Mobile Device Functional Components" filed on Aug. 24, 2011; and U.S. patent application Ser. No. 14/329,382, entitled, "Driving Distraction Reduction System and Method," filed on Jul. 11, 2014 All of the foregoing documents are hereby incorporated by reference for all purposes to the extent allowable by law and as if fully contained herein.

Figure 3:
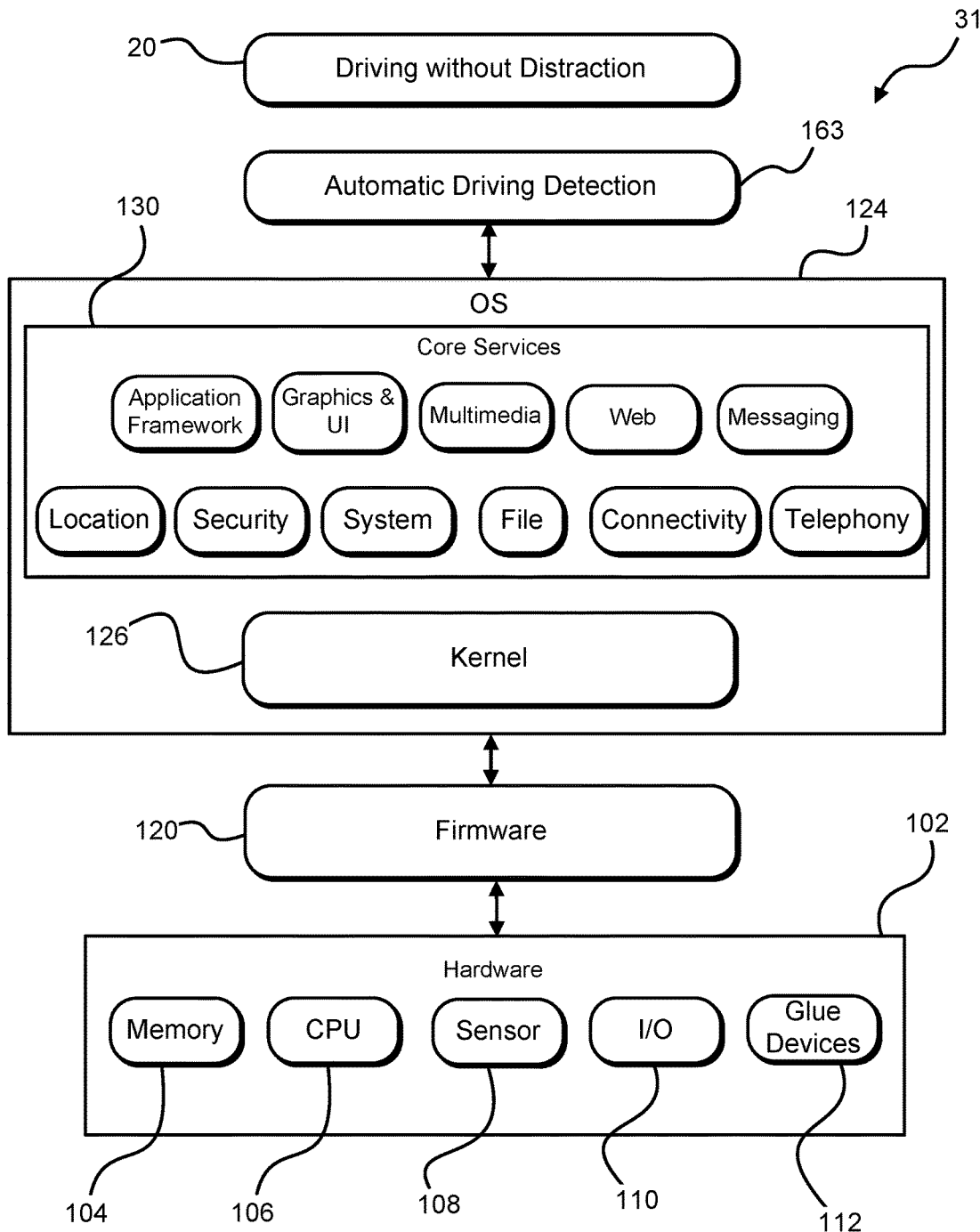
FIG. 3 is a hierarchical view of the mobile device 31 shown in FIGS. 1 and 2.

Referring to FIG. 3, an automatic driving detection application ("driving detection app") 163 is shown that accesses location data (e.g, GPS sensor data, cell tower triangulation data, or other device or network based location data) and sensor data, specifically including acceleration data from an accelerometer of the mobile device on which they are running. The driving detection app 163 is configured to activate a sensor for example a GPS sensor or accelerometer and access data generated by such sensor. From that information and data the driving detection app 163 and thus the DWD system 20 determines when a mobile device 31, 32 is in a moving vehicle.

Figure 5A:
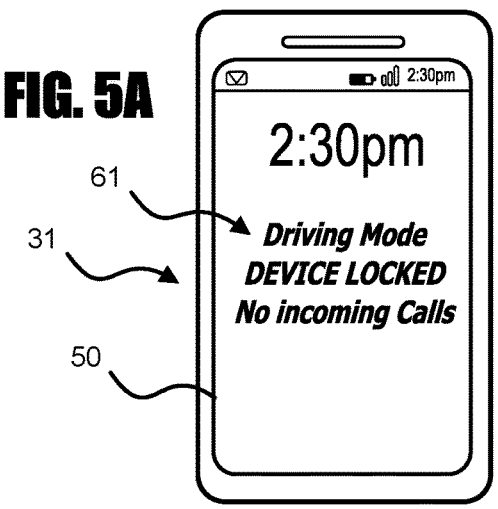
FIG. 5A-5F are exemplary screen shots of the mobile device 31 when practicing the driving without distraction system.

Still referring to FIG. 2, when the driving distraction program determines that the mobile device 31 is in a moving vehicle, either when set by the user or as determined automatically, the mobile device 31 displays an alternate user interface such as that shown in FIG. 5A on the display 50 of the mobile device 31. The display 50 in FIG. 5A shows explanatory text 62 including "Driving Mode", "Device Locked", and "No incoming calls", to describe a state of the mobile device 31. That alternate user interface can also include other messages listing the function or functions that are disabled. The display 50 can be set by the DWD system 20 app or by the driving detection app 163.

FIG. 3 illustrates in abstract the hierarchical functioning of the mobile device 31 from its basic hardware to the top level DWD system 20 app. At the lowest abstraction level the mobile device 31 is a collection of basic hardware 102 devices. Such hardware 102 includes memory 104 (which includes non-volatile memory), a central processor unit ("CPU") 106, numerous sensors 108, including a GPS system and a motion sensor such as an accelerometer, along with their support electronics, input/output ("I/O") 110 support (specifically including display screens and drivers, audio drivers and outputs, RF transceivers, etc.), and glue devices 112 as required to change voltage levels or signal levels and to perform other interfacing as required for proper hardware 102 functionally. As discussed above the outputs of the various sensors are used to detect driving.

Turning specifically to the memory 104, that memory includes non-transitory memory that retains both the operating system and the DWD system 20 app. The memory 104 also includes temporary RAM as required to operate the mobile device 31.

The next level of abstract hierarchical progression is firmware 120, if required. Firmware 120 is useful for enabling upgrading of the mobile device 31 by storing in the non-volatile memory of the memory 104 various settings such as model numbers, version numbers, and controlling bits which establish a set of functions and which can limit or restrict the capabilities of the mobile device 31. In practice, the network carrier 25 will often set the firmware 120 to work with the communication system 18 and with the capabilities desired by the network carrier 25.

Moving up the abstract hierarchical progression, above the firmware 120 is an operating system 124. The operating system 124 provides a set of core software programs that manage the hardware 102 and firmware 120 and that implement common services which support one or more applications, specifically including the DWD system 20 app.

The operating system 124 includes a low-level "kernel" routine 126 that handles basic software integration to the firmware 120 and hardware 102 and that implements underlying functions. Over the kernel 126 is a set of core services 130 that while still basic may change from time to time or from family device to family device. The core services 130 are software functions that support the on-board services of the mobile device 31. The core services 130 may include software routines that support and enable the application framework such as graphics, web support, messaging, location finding (GPS), system security, connectivity, telephony and a file system. Importantly, the application framework should be understood as including apps.

Overlaying the operating system 124 is the driving detection app 163. The driving detection app 163 automatically detects when the driver 35 is driving a vehicle. The driving detection app 163 can be in accord with any of the foregoing patent documents incorporated herein by reference above or it may be any other driving detection application. The driving detection app 163 may be supplemented by manual entry of a driving condition.

Moving up the abstract hierarchical progression, above the driving detection app 163 is the DWD system 20 app. As previously noted the DWD system 20 may be part of the driving detection app 163 or it may be a standalone application. The DWD system 20 app may be installed after being downloaded from the network carrier 25, supplied by a third party provider, input by either the driver 35 or another (such as a parent), or may be supplied with the mobile device 31. Once installed, the DWD system 20 app can be set up to improve safety by supporting the driver 35 to use and follow the tools available to reduce distractions while driving.

The DWD system 20 tracks driving in accord with the determination that the driver 35 is driving a vehicle. To enable the DWD system 20 to perform its function it must know when the driver 35 is driving. That is the task performed by the driving detection app 163. Thus the DWD system 20 uses information from the driving detection app 163 at least to determine whether or not the driver 35 is driving, and whether if driving the driver 35 is using the driving detection app 163. Those determinations are referred to herein as not driving, protected driving when the driver is driving in accord with the driving detection app 163, and unprotected driving when the driver is driving but not in accord with the driving detection app 163.

To determine that the driver 35 is driving, the CPU processor 106 acts under the commands of the software code of the driving detection app 163 and/or the DWD system 20 app. The location data (e.g., GPS data) and/or sensor data (e.g., accelerometer data) are processed to detect driving. When driving is detected, the driving detection app 163 and/or the DWD system 20 app adjust one or more of the settings 42 to disable at least one functional component of the mobile device 31 (e.g., a feature 40, capability 44, or resource 46; reference FIG. 2). If the driver 35 is driving unprotected (with the driving detection app 163 inactive), then the CPU processor 106 acts under the commands of the software code of the DWD system 20 app. Disabling a functional component can correspond to partially or completely disabling or modifying the functional component to reduce functionality of the mobile device. Such disabled or modified functionality can correspond to voice calling, electronic text messaging, and application execution. One useful approach is to disable all communications except to a particular party (such as a parent) or service (such as 911).

Figure 4:
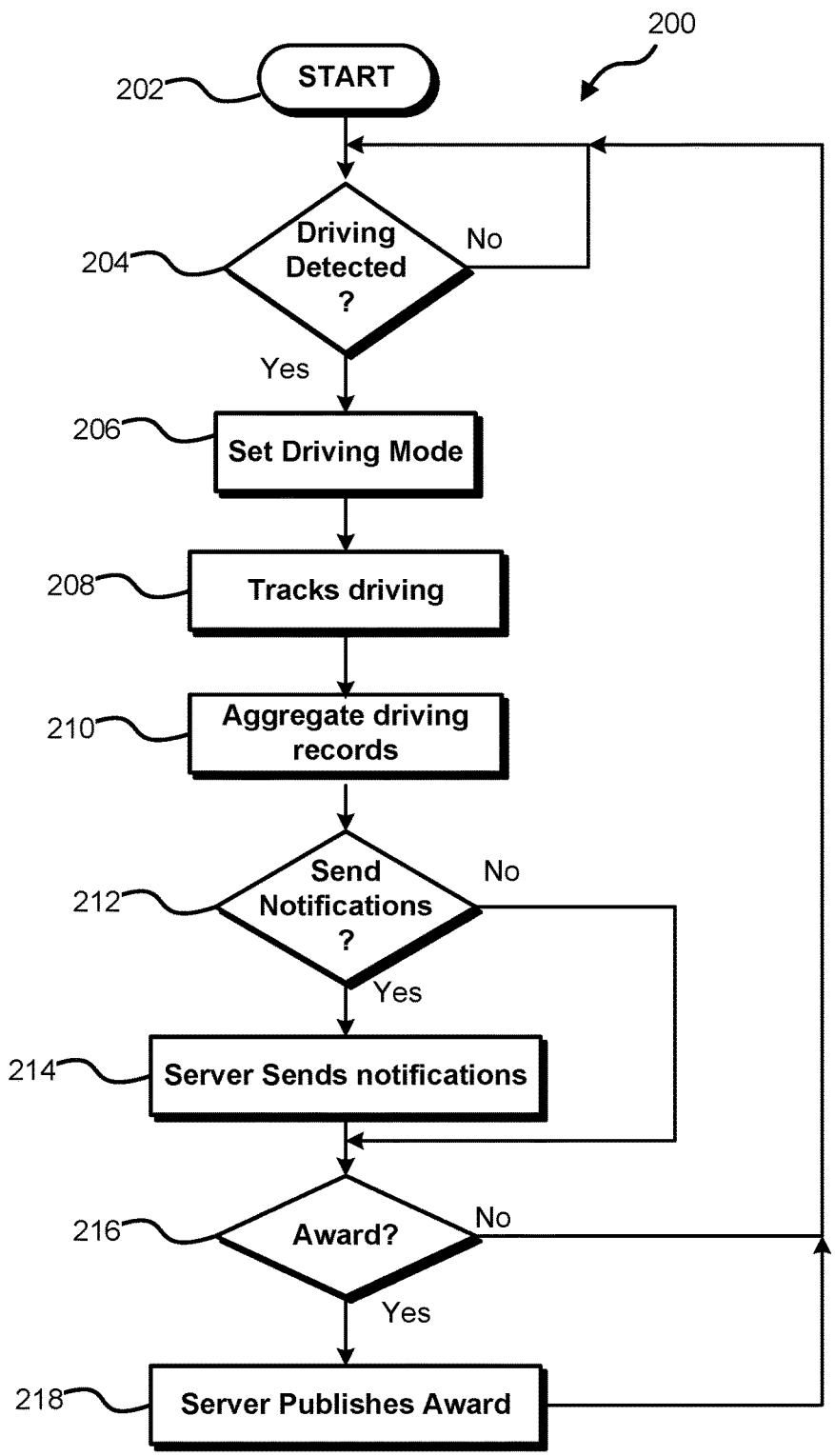
FIG. 4 is a flow diagram of the operation of the driving without distraction system.

The DWD system 20 is designed to motivate protected driving. FIG. 4 presents a flow chart of the basic system 200 operations of the DWD system 20. The system 200 starts, step 202, and proceeds to determining if driving is detected, step 204. As previously noted determining if the driver 35 is driving can be done automatically or the driver can signal he/she is driving. If driving is not detected a loop is entered until driving is detected. However, the driving detection app 163 is always operating to enable the DWD system 20 to distinguish between protected and unprotected driving.

If driving is detected in step 204, the system 200 causes the mobile device 31 to enter its driving mode, step 206. The driving mode enables the DWD system 20 to determine if the driver 35 is driving protected or unprotected depending on whether the mobile device 31 is switched to its safe driving conditions. Safe driving conditions will typically shut off ring-tones and vibrations and limit outgoing calls to emergency numbers only. Typically the DWD system 20 app on the mobile device 31 will either cause or allow the driving detection app 163 to display a notification on the display screen 50 of the mobile device 31 to the driver. Referring to FIG. 5A, a screen display 50 of the mobile device 31 shows an exemplary notification 61 indicating that the mobile device 31 is locked, that incoming calls cannot be received, and that driving has been detected.

Figure 5B:
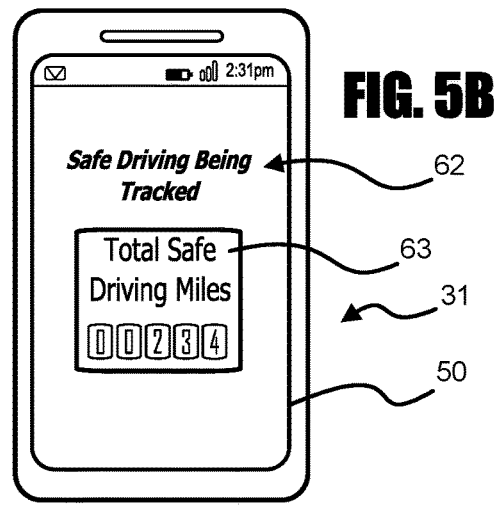

After the driving mode is entered the system 200 proceeds by tracking driving, step 208, and then aggregating that tracked driving, step 210. To that end the mobile device 31 can track its own information and inform the server 12 about the driving status, and/or the server 12 can track driving for example via a network-based position determining entity. In addition, the mobile device 31 provides the driver 35 with information about the use of the DWD system 20. Referring to FIG. 5B, the screen display 50 of the mobile device 31 provides operation data including explanatory text 62 "Safe Driving Being Tracked" and an indication 63 of the protected miles driven ("Total Safe Driving Miles") corresponding to the mobile device is operated with the DWD system 20 active.

Tracked driving can include the status of whether driving is protected or unprotected, the total miles in each status, and the total time in each status. Tracked driving is sortable by locations in each status, by the time of day in each status, by the roads traveled in each status, as percentages of travel distances or travel times in each status, or any other programmed factor. Driving can be tracked by recurring time spans such as daily, weekly, or monthly, length of time the mobile device is operated with the DWD system 20 active, the time a particular mobile device is operated with the DWD system 20 operating relative to the total time the mobile device is operated. Additionally or alternatively, tracking can be by total aggregates from some chosen point in time (e.g., from when the app first launches).

If the mobile device 31 tracks its own information, the information is sent to the server 12 over the network 25 for subsequent use by the server 12. In addition, the server 12 receives tracked driving information from a plurality of other drivers, such as the second user 37, which are using their own DWD system 20.

While maintaining a record of the tracked driving of the DWD system 20 on the mobile device 31 is a useful motivator for the driver 31 to actually use the driving detection app 163, motivation can be improved by making use of the server's 12 records of the tracked driving of all users of DWD systems 20. First, the server aggregates all of those records (again, step 210) to provide grand totals and comparisons of individual rankings of drivers in protected driving verses unprotected driving status (such as by total miles, percentages, total times in each status, times, locations, roads, or any other programmed factor). The server 12 can track by recurring time spans—such as daily, weekly, or monthly or other programmed factor.

Once the server 12 has aggregated the driving records, the server 12 then selectively determines whether or not to send notifications, step 212 to other drivers. Such notifications can include transmitting operation data to one or more users of DWD systems 20. Referring to FIG. 5B for example, the DWD system 20 can cause the particular mobile device 31 to display the indication 62 to show miles traveled in a protected mode. Many other notifications are possible such as sending all users aggregate information, their individual rankings, rankings of selected other users, or other programmed notification. Operation data sent to the mobile device 31 need not only be that of the driver 35, but can also include operation data corresponding to another user, such as the second user 37, or corresponding to a group of drivers. That group of drivers may be taken from a particular geographic area or taken from a particular social networking group. If notifications are to be sent, the server 12 (or the mobile device 31) sends the notifications, step 214.

Figure 5C:
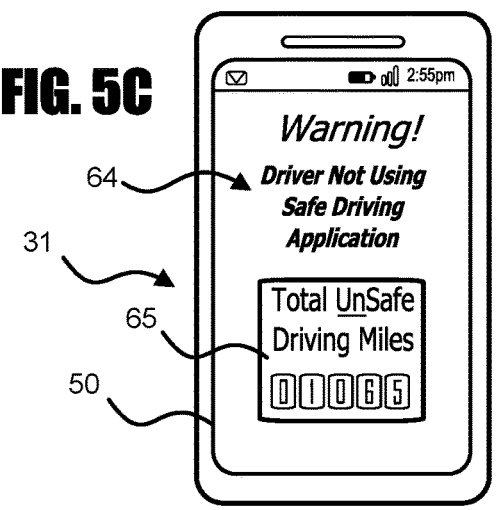

Notifications can be sent to the driver 35 and/or to the second user 37 to notify them that the driver 35 is safely driving, to a third party such as a parent or an employer, or to another party. Notifications can include the tracked protected driving miles as shown in FIG. 5B, the aggregated driving totals in each status, and whether or not the driver is actually using the driving detection app 163 at any particular time. FIG. 5C shows an exemplary notification including explanatory text 64 including "Warning! Driver Not Using Safe Driving Application" and an indication 65 of total unprotected miles driven (i.e., "Total Unsafe Driving Miles").

Figure 5D:
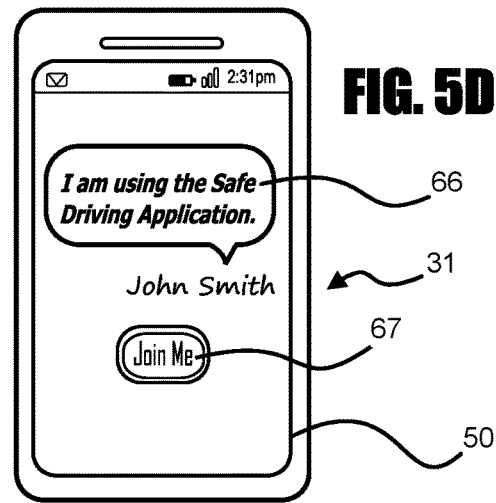

The tracked driving aggregates in each status can be sent to the individual users (driver 35/second user 37) as a motivational or informational mechanism or to third parties to notify them of the status of protected driving verses unprotected driving. In addition, comments from the driver 35 can be sent to the second user 37 and vice versa. Referring to FIG. 5D, an exemplary invitation sent from the second user 37 to the driver 35 is shown in which explanatory text 66 indicates that the second user "John Smith" is "using the Safe Driving Application", and a button 67 labeled "Join Me" is provided for the driver 35 to activate the DWD system 20 app and/or the driving detection app 163 to enable protected driving on the mobile device 31. Totals can also be set for display by other users and to the wider community on web pages, mobile optimized web pages, and other communication mechanisms. This sets up challenges to others to use their driving detection app 163 and the DWD system 20 app to drive protected.

In addition, the total aggregate of protected driving can be displayed for purposes of marketing, public relations, and goodwill as well as being a permanent safety record.

Driving status can be broken out by city, by other geographic boundaries, by friend groups, or by another affiliation with the goal to engender competition to drive more responsibly. The same can be done with individuals' responsible driving totals within those groups—for example letting users see how they stack up compared to their friends, colleagues, or neighbors.

Figure 5E:
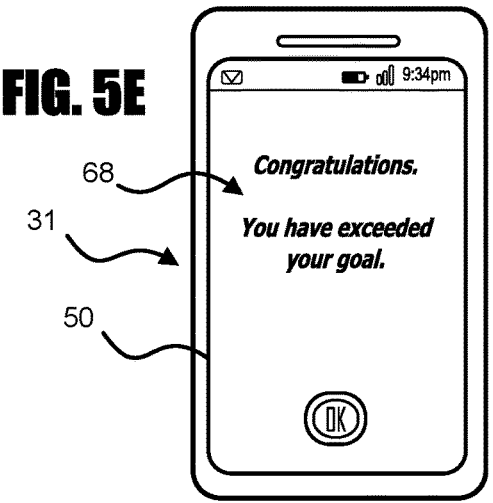

If notifications are not to be sent per step 212, or after notifications have been sent per step 214, a determination is made by a processor as to whether an award should be granted, step 216. In practice, individual users or groups of users could be recognized for special achievements in responsible driving and then so notified. Referring to FIG. 5E, an award in the form of explanatory text 68 includes the description: "Congratulations. You have exceeded your goal." Awards can be generated based on reaching special milestones such as total distance driven while protected (e.g. 10,000 protected driving miles), total aggregated time of driving protected by consecutive days, weeks or months spent driving protected, high percentages of trips using protected driving, or for being among the highest users of protected driving as compared with other drivers.

If no award is to be given per step 216, or after such an award is provided per step 218, the system 200 returns to step 204 for a determination of whether the driver 31 is still driving.

Figure 5F:
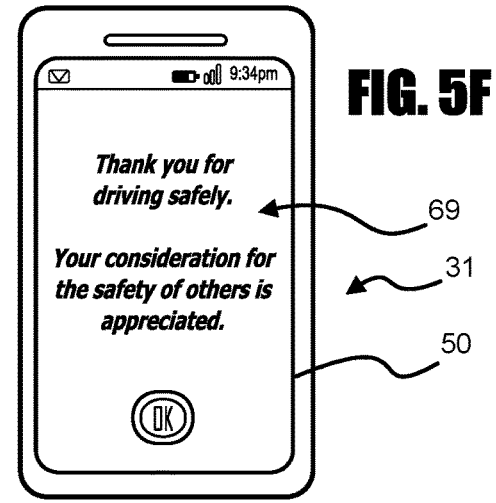

In addition to the foregoing, the DWD system 20 system can facilitate communication between users. Examples include messaging between users (provided within the app or via external messaging apps) or basic interactions, such as recognizing or applauding another's achievements. The DWD system 20 app can allow users to thank each other, regardless of whether or not the two users know each other, for using the app to drive responsibly, reference the exemplary notification 69 of FIG. 5F.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

What is claimed is:

1. A method comprising:
    transmitting a particular reduced distraction application ("the particular application") to a plurality of mobile devices, the particular application configured to:
        access at least one of location data or sensor data of a particular mobile device on which the particular application is installed;
        determine when the particular mobile device is in a moving vehicle based on the at least one of the location data or the sensor data;
        set a driving mode based on determining that the particular mobile device is in a moving vehicle;
        provide operation data corresponding to use of the particular application on the particular mobile device to a particular user of the particular mobile device via a user interface, the operation data comprising at least one of:
            distance traveled by the particular mobile device with the particular application active and a total distance traveled by the particular mobile device; or
            length of time the particular mobile device is operated with the particular application active and a total length of time the particular mobile device is operated; and
        transmit the operation data through a network;
    receiving by a network connectable computing system from the plurality of mobile devices operation data corresponding to use of the particular application on the plurality of mobile devices;
    aggregating by a processor the operation data from the plurality of mobile devices wherein the aggregated operation data comprises at least one of:
        distance traveled by the plurality of mobile devices with the particular application active and a total distance traveled by the plurality of mobile devices; or
        length of time the plurality of mobile devices are operated with the particular application active and a total length of time the plurality of mobile devices are operated; and
    selectively transmitting the operation data of the plurality of mobile devices to a plurality of users of the plurality of mobile devices, the particular application further configured to provide to the particular user of the particular mobile device via the user interface the operation data of the plurality of mobile devices.

2. The method of claim 1, further comprising activating at least one of an accelerometer or a GPS sensor to access the at least one of the location data or the sensor data.

3. The method of claim 1, further comprising selectively transmitting awards to the plurality of users based on at least one of:
    the distance traveled by the plurality of mobile devices with the particular application active and the total distance traveled by the plurality of mobile devices; or
    the length of time the plurality of mobile devices are operated with the particular application active and the total length of time the plurality of mobile devices are operated.

4. The method of claim 1, further comprising:
    comparing the operation data from the plurality of mobile devices; and
    providing to at least one of the plurality of mobile devices comprising the particular user of the particular mobile device a ranking of the operation data based on at least one of:
        the distance traveled by the plurality of mobile devices with the particular application active and the total distance traveled by the plurality of mobile devices; or
        the length of time the plurality of mobile devices are operated with the particular application active and the total length of time the plurality of mobile devices are operated;
    wherein the particular application is configured to provide to the particular user of the particular mobile device via the user interface the ranking of the operation data of the particular user relative to the operation data of others of the plurality of users.

5. The method of claim 1, further comprising providing to the particular user of the particular mobile device based on the aggregated operation data via the user interface an indication of at least one of:
- a distance traveled by the particular user without the particular application active and the distance traveled by the particular user with the particular application active;
- a distance traveled by the plurality of users without the particular application active and the distance traveled by the plurality of users with the particular application active;
- a length of time the particular mobile device operated without the particular application active and the length of time the particular mobile device operated with the particular application active;
- a length of time the plurality of mobile devices operated without the particular application active and the length of time the plurality of mobile devices operated with the particular application active; or
- a distanced traveled by the particular user without the particular application active relative to the distance traveled by the particular user with the particular application active.

6. A method comprising:
- running a reduced distraction program on a plurality of mobile devices;
- detecting via the reduced distraction program when the plurality of mobile devices are in respective ones of a plurality of moving vehicles;
- setting for the plurality of mobile devices a driving mode when detected in the respective ones of the plurality of moving vehicles, wherein driving is determined to be protected driving when the reduced distraction program is being followed and unprotected driving when the reduced distraction program is not being followed;
- tracking the protected driving of the plurality of mobile devices;
- aggregating the protected driving of the plurality of mobile devices;
- comparing the protected driving of the plurality of mobile devices; and
- notifying a particular user of at least one of the plurality of mobile devices via the reduced distraction program of the comparing of protected driving of the plurality of mobile devices.

7. The method of claim 6, further comprising activating via the reduced distraction program at least one of an accelerometer or a GPS sensor to detect when the plurality of mobile devices are in the respective ones of a plurality of moving vehicles.

8. The method of claim 6, wherein the notifying comprises providing the particular user of the at least one of the plurality of mobile devices a ranking of the particular user relative to other users of the plurality of mobile devices based on the comparing of the protected driving of the plurality of mobile devices.

9. The method of claim 6, wherein the notifying comprises providing the particular user of the at least one of the plurality of mobile devices an award based on the comparing of the protected driving of the plurality of mobile devices.

10. The method of claim 6, further comprising:
- tracking the unprotected driving of the plurality of mobile devices; and
- aggregating the unprotected driving of the plurality of mobile devices;
- wherein the comparing comprises comparing the protected driving relative to the unprotected driving of the plurality of mobile devices.

11. The method of claim 10, wherein the protected driving relative to the unprotected driving of the plurality of mobile devices comprises a percentage of trips of the particular user with the reduced distraction program being followed.

12. A method comprising:
- transmitting a particular reduced distraction application ("the particular application") to a plurality of mobile devices of a plurality of users, the particular application configured to:
  - access at least one of location data or sensor data of a particular mobile device on which the particular application is installed;
  - determine when the particular mobile device is in a moving vehicle based on the at least one of the location data or the sensor data;
  - set a driving mode based on determining that the particular mobile device is in a moving vehicle;
  - provide operation data indicating use of the particular application on the particular mobile device to a particular user of the particular mobile device via a user interface, and
  - transmit the operation data through a network;
- receiving by a network connectable computing system from the plurality of mobile devices operation data indicating use of the particular application on the plurality of mobile devices;
- aggregating the operation data from the plurality of mobile devices and comparing by at least one processor the operation data of the particular user with the operation data of at least one of the plurality of users other than the particular user; and
- selectively transmitting the operation data of the plurality of mobile devices to the plurality of users of the plurality of mobile devices, the particular application further configured to provide to the particular user of the particular mobile device via the user interface results of the comparing.

13. The method of claim 12, the operation data comprising at least one of:
- distance traveled with the particular application active by the particular mobile device;
- length of time the particular mobile device is operated with the particular application active;
- distance traveled with the particular application active relative to a total distance traveled by the particular mobile device; or
- length of time the particular mobile device is operated with the particular application active relative to a total time the particular mobile device is operated.

14. The method of claim 12, wherein the selectively transmitted operation data of the plurality of mobile devices includes operation data corresponding to a particular group of the plurality of users corresponding to at least one of a particular geographic area or a particular social networking group.

15. The method of claim 12, further comprising:
- rendering the operation data of the plurality of mobile devices accessible by users of the plurality of mobile devices on a network-connected server system; and
- selectively transmitting the operation data of the plurality of mobile devices to users of the plurality of mobile devices via the network-connected server system.

13

16. The method of claim 12, further comprising:
determining that the operation data of the particular mobile device exceeds a particular threshold; and
notifying the particular user of the particular mobile device that the operation data exceeds the particular threshold.

17. The method of claim 12, further comprising:
determining that aggregated operation data of mobile devices of a particular group of the plurality of users exceeds a particular threshold; and
notifying the particular group of the plurality of users that the operation data exceeds the particular threshold;
wherein the operation data comprises at least one of:
aggregate distance traveled with the particular application active on the mobile devices of the particular group;
aggregate length of time the mobile devices of the particular group are operated with the particular application active;
aggregate distance traveled by the mobile devices of the particular group with the particular application active relative to a total distance traveled by the mobile devices of the particular group; or
aggregate length of time the mobile devices of the particular group are operated with the particular application active relative to a total time the mobile devices of the particular group are operated.

18. The method of claim 12, wherein the at least one of the location data or the sensor data comprises location data from a global positioning system ("GPS") sensor, the method further comprising activating the GPS sensor to access the at least one of the location data or the sensor data.

19. The method of claim 12, wherein the at least one of the location data or the sensor data comprises acceleration data from an accelerometer on the particular mobile device, the method further comprising activating at least one of an accelerometer or a GPS sensor on the particular mobile device to access the at least one of the location data or the sensor data.

20. A method comprising:
using a processor to run a reduced distraction program on a particular mobile device;
detecting with the processor whether the particular mobile device is in a moving vehicle;
setting a driving mode when the particular mobile device is detected in a moving vehicle, wherein driving is determined to be protected driving if the reduced distraction program is being followed and unprotected if the reduced distraction program is not being followed;
tracking unprotected driving of the particular mobile device;
tracking protected driving of the particular mobile device;
aggregating unprotected driving and protected driving; and
notifying a party regarding the aggregation of tracked unprotected driving and tracked protected driving.

21. The method of claim 20, wherein the aggregating is performed using a processor of the particular mobile device.

22. The method of claim 20, wherein the aggregating is performed using a processor of a remote computer.

23. The method of claim 20, further comprising:
determining an award should be granted based on the aggregating of the tracked unprotected driving and tracked protected driving; and

14 transmitting the award to the party, wherein the party comprises a user of the particular mobile device.

24. The method of claim 20, further comprising:
determining an award should be granted for reaching a pre-determined protected driving milestone based on the aggregating of the tracked unprotected driving and tracked protected driving; and
transmitting the award to the party, wherein the party comprises a user of the particular mobile device.

25. A mobile computing device ("the particular mobile device") comprising at least one non-transitory computer readable storage medium having encoded thereon instructions that, when executed by one or more processors, cause the particular mobile device to perform a process by a particular reduced distraction application ("the particular application") including:
activating at least one of an accelerometer or a GPS sensor to access at least one of location data or sensor data of the particular mobile device on which the particular application is installed;
determining when the particular mobile device is in a moving vehicle based on the at least one of the location data or the sensor data;
setting a driving mode based on determining that the particular mobile device is in a moving vehicle;
providing operation data indicating use of the particular application on the particular mobile device to a particular user of the particular mobile device via a user interface of the particular mobile device;
transmitting through a network the operation data corresponding to use of the particular application on the particular mobile device;
selectively receiving from a network-connected computing system operation data corresponding to use of the particular application on a plurality of other mobile devices of a plurality of users other than the particular user;
comparing the operation data of the particular user with the operation data of at least one of the plurality of users other than the particular user; and
providing to the particular user of the particular mobile device via the user interface results of the comparing.

26. The particular mobile device of claim 25, wherein providing to the particular user the results of the comparing comprises providing a ranking of the operation data of the particular user compared with the operation data of at least one of the plurality of users other than the particular user.

27. The particular mobile device of claim 26, wherein the providing the ranking is based on at least one of:
distance traveled by the plurality of other mobile devices with the particular application active, total distance traveled by the plurality of other mobile devices, distance traveled by the particular mobile device with the particular application active, and total distance traveled by the particular mobile device; or
length of time the plurality of other mobile devices are operated with the particular application active, total length of time the plurality of other mobile devices are operated, length of time the particular mobile device is operated with the particular application active, and total length of time the particular mobile device is operated.

* * * * *